(12) United States Patent
Ukishima

(10) Patent No.: US 8,861,037 B2
(45) Date of Patent: Oct. 14, 2014

(54) TOTAL COLOR MATERIAL AMOUNT RESTRICTION PROFILE CREATION METHOD, TOTAL COLOR MATERIAL AMOUNT RESTRICTION PROFILE CREATION APPARATUS, IMAGE SIGNAL PROCESSING APPARATUS, IMAGE SIGNAL PROCESSING SYSTEM, AND RECORDING MEDIUM

(71) Applicant: FUJIFILM Corporation, Tokyo (JP)

(72) Inventor: Masayuki Ukishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/037,092

(22) Filed: Sep. 25, 2013

(65) Prior Publication Data

US 2014/0085682 A1     Mar. 27, 2014

(30) Foreign Application Priority Data

Sep. 26, 2012   (JP) .................................. 2012-212239

(51) Int. Cl.
    *G06F 3/12*     (2006.01)
(52) U.S. Cl.
    CPC ..................... *G06F 3/1208* (2013.01)
    USPC .......................... 358/3.23; 358/518

(58) Field of Classification Search
    None
    See application file for complete search history.

(56) References Cited

U.S. PATENT DOCUMENTS 7,460,158 B2   12/2008  Otake et al.

FOREIGN PATENT DOCUMENTS

JP         2005-101934 A      4/2005

*Primary Examiner* — Barbara Reinier
*Assistant Examiner* — Christopher D Wait
(74) *Attorney, Agent, or Firm* — Studebaker & Brackett PC

(57) ABSTRACT

There is provided a technique of enabling the use of a common printer profile even in a case where a configuration of a printer system is changed or added. Color data under a second configuration condition corresponding to an output color which matches or approximates an output color acquired through a first color predictor under a first configuration condition, is searched and acquired from color data subjected to total color material amount restriction processing acquired by total color material amount restriction processing using a first color material amount restriction profile under the first configuration condition, through a second color predictor under the second configuration condition. The color data searched and acquired under the second configuration condition and color data prior to total color material amount restriction processing are associated and a second total color material amount restriction profile under the second configuration condition is created.

11 Claims, 11 Drawing Sheets

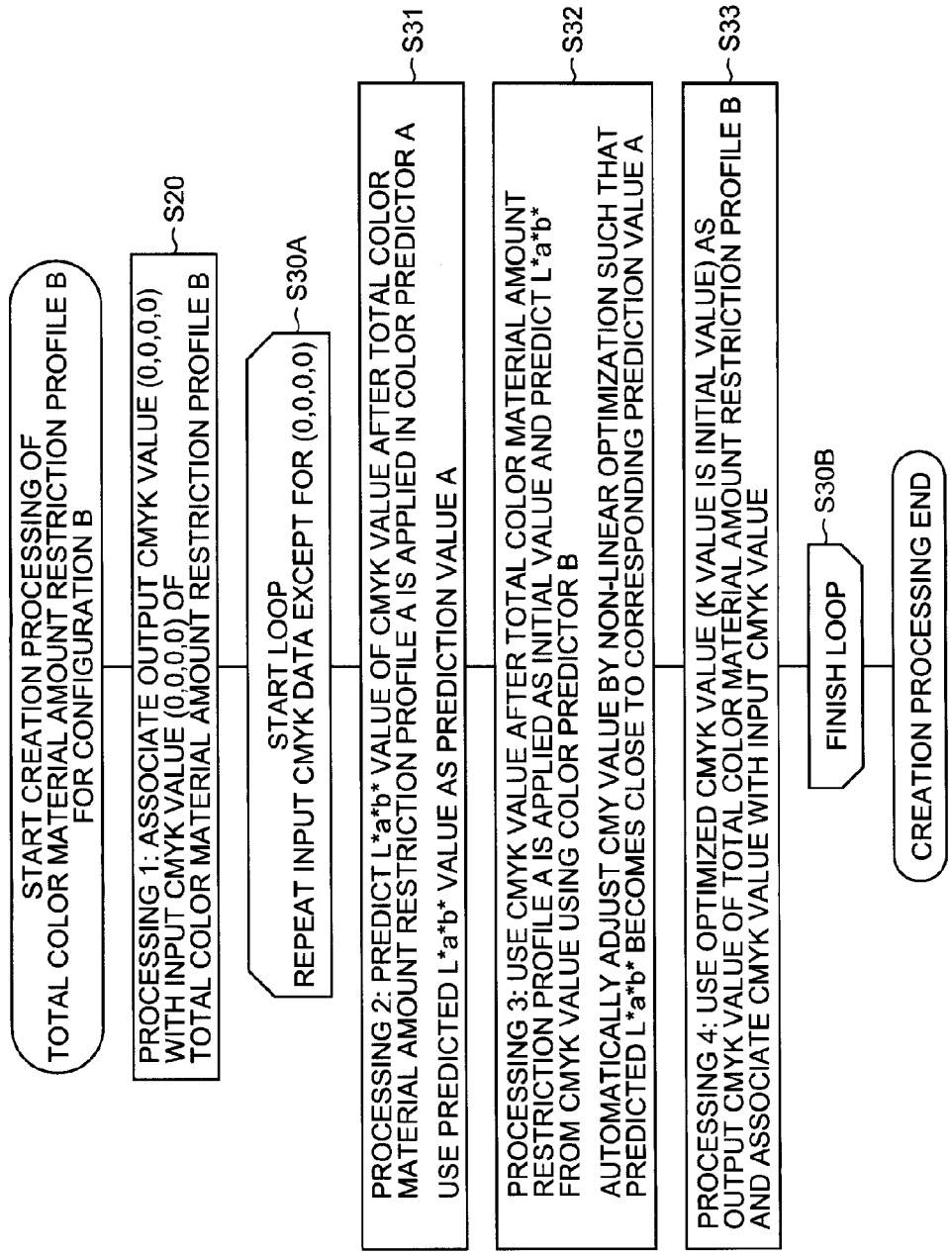

FIG.11A

<CONFIGURATION A> PRINTER PROFILE

TOTAL COLOR MATERIAL AMOUNT RESTRICTION PROFILE — MATCHED

| BEFORE TOTAL COLOR MATERIAL AMOUNT RESTRICTION[%] | | | | AFTER TOTAL COLOR MATERIAL AMOUNT RESTRICTION[%] | | | | L*a*b | | |
|---|---|---|---|---|---|---|---|---|---|---|
| C | M | Y | K | C | M | Y | K | L* | a* | b* |
| 0 | 0 | 0 | 0 | 0 | 0 | 0 | 0 | 100 | 0 | 0 |
| 0 | 0 | 0 | 10 | 0 | 0 | 0 | 10 | 93.9 | -0.29 | 0.14 |
| 0 | 0 | 0 | 20 | 0 | 0 | 0 | 20 | 87.7 | -0.56 | 0.18 |
| ........ | | | | ........ | | | | ........ | | |
| 80 | 80 | 80 | 10 | 80 | 80 | 80 | 10 | 35.9 | 3.86 | 1.30 |
| 80 | 80 | 80 | 20 | 77 | 77 | 76 | 20 | 33.9 | 3.32 | 1.29 |
| 80 | 80 | 80 | 30 | 73 | 74 | 73 | 30 | 31.9 | 2.70 | 1.33 |
| ........ | | | | ........ | | | | ........ | | |
| 100 | 100 | 100 | 80 | 57 | 57 | 56 | 80 | 14.2 | -1.46 | -1.70 |
| 100 | 100 | 100 | 90 | 53 | 54 | 53 | 90 | 12.4 | -0.22 | -0.74 |
| 100 | 100 | 100 | 100 | 50 | 50 | 50 | 100 | 10.3 | 1.59 | -0.68 |

COMMON FOR CONFIGURATION A    COMMON

FIG.11B

<CONFIGURATION B> PRINTER PROFILE

TOTAL COLOR MATERIAL AMOUNT RESTRICTION PROFILE — MATCHED OR APPROXIMATED

| BEFORE TOTAL COLOR MATERIAL AMOUNT RESTRICTION[%] | | | | AFTER TOTAL COLOR MATERIAL AMOUNT RESTRICTION[%] | | | | L*a*b | | |
|---|---|---|---|---|---|---|---|---|---|---|
| C | M | Y | K | C | M | Y | K | L* | a* | b* |
| 0 | 0 | 0 | 0 | 0 | 0 | 0 | 0 | 100 | 0 | 0 |
| 0 | 0 | 0 | 10 | 0 | 0 | 0 | 10 | 93.9 | -0.29 | 0.14 |
| 0 | 0 | 0 | 20 | 0 | 0 | 0 | 20 | 87.7 | -0.56 | 0.18 |
| ........ | | | | ........ | | | | ........ | | |
| 80 | 80 | 80 | 10 | 76 | 77 | 82 | 10 | 35.9 | 3.86 | 1.30 |
| 80 | 80 | 80 | 20 | 74 | 75 | 78 | 20 | 33.9 | 3.32 | 1.29 |
| 80 | 80 | 80 | 30 | 70 | 71 | 75 | 30 | 31.9 | 2.70 | 1.33 |
| ........ | | | | ........ | | | | ........ | | |
| 100 | 100 | 100 | 80 | 53 | 54 | 57 | 80 | 14.2 | -1.46 | -1.70 |
| 100 | 100 | 100 | 90 | 50 | 52 | 55 | 90 | 12.4 | -0.22 | -0.74 |
| 100 | 100 | 100 | 100 | 47 | 49 | 51 | 100 | 10.3 | 1.59 | -0.68 |

COMMON    FOR CONFIGURATION B    COMMON

TOTAL COLOR MATERIAL AMOUNT RESTRICTION PROFILE CREATION METHOD, TOTAL COLOR MATERIAL AMOUNT RESTRICTION PROFILE CREATION APPARATUS, IMAGE SIGNAL PROCESSING APPARATUS, IMAGE SIGNAL PROCESSING SYSTEM, AND RECORDING MEDIUM

BACKGROUND OF THE INVENTION

1. Field of the Invention

The present invention relates to various methods, apparatuses, systems, programs, and recording media related to the total color material amount restriction profile to restrict the color material amount provided to a recording medium by an image formation apparatus.

2. Description of the Related Art

In general, a desired image is widely formed to a recording medium such as a sheet of paper by providing a color material (recording liquid) such as an ink and toner by the use of an image formation apparatus such as an ink jet printer and electrophotographic image formation apparatus.

At the time of image formation, when color materials are provided to a recording medium in a superimposed manner, there is a case where the recording medium may not sufficiently absorb some color materials which are excessively provided. In this case, the patch color reproducibility may be impaired, the decrease in the membrane properties due to an excessive color material may be caused, or a sheet of paper may be warped due to the excessive color material to cause a problem during medium conveyance.

In view of preventing a color material from being excessively provided, Japanese Patent Application Laid-Open No. 2005-101934 discloses a technique of restricting the amount of ink by under-color removal processing that replaces a predetermined amount of a CMY signal with a K signal. According to the technique disclosed in Japanese Patent Application Laid-Open No. 2005-101934, it is possible to prevent an ink from being excessively provided to a recording medium and avoid the above-mentioned various problems that may occur at the time of printing.

SUMMARY OF THE INVENTION

Meanwhile, in the field of printing industry, to accurately reproduce colors of an image designed by a client, processing using a so-called color management system (CMS) is performed. In color management by the CMS, output colors with respect to various input signals to a printer are held in advance as a lookup table (LUT) such that a client can find an input color to reproduce an intended color by referring to the LUT. This LUT is also called a "printer profile," and it is not uncommon that a printing firm strict on color management uniquely creates a printer profile. Especially, in a case where the color material amount is restricted as described above, in order to enhance the accuracy of the printer profile, it is necessary to appropriately understand an output color after restricting the color material amount with respect to an input signal.

By the way, when a configuration of a printer system is changed according to a change in a so-called halftoning method (which includes a binarization method of creating a binarized image with ON/OFF of a dot defined and a multi-valued method of being able to represent a plurality of dot sizes like small/medium/large dots, which are collectively referred to as a "multivalued method") or a change in the color material type, since the relationship between an input signal and an output signal accordingly changes, it is necessary to create a printer profile again. Moreover, in a case where a plurality of multivalued methods are mounted in a printer system, it is necessary to create a printer profile for each multivalued method.

However, since the printer profile is normally made by outputting patches of various colors and measuring the colors of the patches, it takes many steps to create a printer profile and the processes involve very troublesome operations. Especially, in a case where a printing firm (or user) creates a unique printer profile, when a new configuration different from an existing configuration is introduced into a printer system, the printing firm side needs to create a new printer profile supporting the new configuration, which burdens the printing firm.

The present invention is made in view of the above-mentioned conditions, and it is an object to provide a technique of enabling the use of a common printer profile even if a configuration of the printer system is changed or added.

One aspect of the present invention relates to a total color material amount restriction profile creation method used in image signal processing which creates an image signal supplied to an image formation apparatus and which includes color management system processing using a common printer profile and total color material amount restriction processing using a total color material amount restriction profile after the color management system processing, the method includes: a step of acquiring a first total color material amount restriction profile that defines a correspondence relationship between color data prior to total color material amount restriction processing before the total color material amount restriction processing used in the color management system processing is implemented, and color data subjected to total color material amount restriction processing which is acquired by the total color material amount restriction processing, under a first configuration condition of the image formation apparatus; a step of acquiring a first color predictor that defines a correspondence relationship between the color data that has been subjected to total color material amount restriction processing and an output color output from the image formation apparatus, under the first configuration condition of the image formation apparatus; a step of acquiring a second color predictor that defines a correspondence relationship between color data based on an image signal input in the image formation apparatus and an output color output from the image formation apparatus, under a second configuration condition of the image formation apparatus; a step of searching and acquiring, through the second color predictor, color data under the second configuration condition corresponding to an output color that matches or approximates an output color which is acquired through the first color predictor from the color data subjected to total color material amount restriction processing acquired by total color material amount restriction processing using the first total color material amount restriction profile; and a step of associating the color data searched and acquired under the second configuration condition and the color data prior to total color material amount restriction processing, and creating a second total color material amount restriction profile.

The present aspect is applicable to color data of colors including C (cyan), M (magenta), Y (yellow) and K (black), and in this case, the present aspect relates to a total color material amount restriction profile creation method used in image signal processing which creates an image signal supplied to an image formation apparatus and which includes color management system processing using a common printer profile and total color material amount restriction processing using a total color material amount restriction profile after the color management system processing, the method includes: a step of acquiring a first total color material amount restriction profile that defines a correspondence relationship between CMYK data prior to total color material amount restriction processing before the total color material amount restriction processing used in the color management system processing is implemented, and CMYK data subjected to total color material amount restriction processing which is acquired by the total color material amount restriction processing, under a first configuration condition of the image formation apparatus; a step of acquiring a first color predictor that defines a correspondence relationship between the CMYK data subjected to total color material amount restriction processing and an output color output from the image formation apparatus, under the first configuration condition of the image formation apparatus; a step of acquiring a second color predictor that defines a correspondence relationship between color data or CMYK data based on an image signal input to the image formation apparatus, and an output color output from the image formation apparatus, under a second configuration condition of the image formation apparatus; a step of searching and acquiring, through the second color predictor, CMYK data under the second configuration condition corresponding to an output color that matches or approximates an output color which is acquired through the first color predictor from the CMYK data subjected to total color material amount restriction processing acquired by total color material amount restriction processing using the first total color material amount restriction profile; and a step of associating the CMYK data searched and acquired under the second configuration condition and the CMYK data prior to total color material amount restriction processing, and creating a second total color material amount restriction profile.

According to the present aspect, it is possible to create the second total color material amount restriction profile such that it is possible to perform color management system processing using the common printer profile under both the first configuration condition and the second configuration condition. By this second total color material amount restriction profile, it is possible to absorb the output color change caused by the change in the configuration.

The common printer profile described herein is a printer profile which is used in the color management system processing and which can be commonly used in a case where the image formation device adopts the first configuration and in a case where the image formation device adopts the second configuration. This common printer profile is created in consideration of the output color property of the image formation device under the first configuration condition.

Moreover, the total color material amount restriction processing is processing which restricts the total amount of color materials output from the image formation device and which restricts an input signal value (i.e., color data value) based on the total color material amount restriction profile such that the color materials are not excessively provided from the image formation apparatus.

Moreover, the configuration of the image formation apparatus is a concept in which the entire system configuration that may influence the output colors of the image formation apparatus may be included, and the configuration may be specified by, for example, the half tone method, the output color materials, and so on.

Moreover, the color predictor is a concept in which all devices to predict and acquire the color data on a second color space corresponding to the input color data represented on a first color space may be included, and the color predictor can be formed with software and/or hardware, and so on. Therefore, input color data (e.g., CMYK data and RGB data) represented on the device dependence color space can be equivalently converted into color data (e.g., L*a*b* data) represented on the device non-dependence color space using the color predictor.

Moreover, the color material is a recording liquid output from the image formation apparatus, such as an ink, toner and other image recording liquids.

Preferably, the color data includes data of multiple colors including a black color, and in the step of searching and acquiring the color data under the second configuration condition, the color data subjected to total color material restriction processing which is acquired by total color material amount restriction processing using the first total color material amount restriction profile is used as an initial value, and by changing color data of other colors than the black color from the initial value without changing color data of the black color from the initial value, the color data under the second configuration condition is searched and acquired.

In one example in which the present aspect is applied to color data of CMYK, in the step of searching and acquiring CMYK data under the second configuration condition, CMYK data subjected to total color material restriction processing acquired by total color material amount restriction processing using the first total color material amount restriction profile is used as an initial value, and by changing data of at least one piece of the CMY data from the initial value without changing the K data from the initial value, the CMYK data under the second configuration condition is searched and acquired.

In this case, it is possible to efficiently search and acquire the CMYK data under the second configuration condition. That is, since there are many cases where there is a relatively low possibility that there is a large difference between the CMYK data subjected to total color material amount restriction processing under the configuration condition and the CMYK data subjected to total color material amount restriction processing under the second configuration condition, by adopting the CMYK data subjected to total color material amount restriction processing based on the first total color material amount restriction profile as the initial value, it is possible to search and acquire the CMYK data under the second configuration condition in a relatively short time.

Moreover, without changing the K data from the initial value, it is possible to expect advantageous effects that: it becomes less likely to wreck the search; it is possible to find CMYK data to assign matched or approximated colors in a relatively easy manner; it is possible to shorten the calculation time; and it is possible to reduce the risk that a tone jump between tones or an unexpected color change occurs.

Preferably, in the step of searching and acquiring the color data under the second configuration condition, the color data subjected to total color material restriction processing acquired by total color material amount restriction processing using the first total color material amount restriction profile is used as an initial value, a data value is not changed from 0 with respect to color data of a color with a data value of 0 in the color data subjected to total color material amount restriction processing used as the initial value, and the color data under the second configuration condition is searched and acquired.

In one sample in which the present aspect is applied to the color data of CMYK, a data value is not changed from 0 with respect to CMY data with a data value of 0 in the CMYK data subjected to total color material amount restriction processing used as the initial value, and the CMYK data under the second configuration condition is searched and acquired.

In this case, it is possible to expect an advantageous effect that the color properties of the printer system become more natural.

Preferably, in the step of searching and acquiring the color data under the second configuration condition, a non-linear optimization method with restriction is used.

In this case, an optimum value of color data (e.g., CMYK data) under the second configuration condition may be effectively acquired.

The non-linear optimization method with restriction described herein is a non-linear optimization method which makes a solution to minimize an objective function under given restriction, and as the non-linear optimization method with restriction, for example, it is possible to adopt a method combining the down-hill (downhill) simplex method that is a non-linear optimization method without known restriction and the penalty function method that is a known method to impose a constrained condition at the time of optimization.

Another aspect of the present invention relates to a total color material restriction profile creation apparatus used in image signal processing which creates an image signal supplied to an image formation apparatus and which includes color management system processing using a common printer profile and total color material amount restriction processing using a total color material amount restriction profile after the color management system processing, the apparatus includes: a search and acquisition device which searches and acquires, through a second color predictor, color data under a second configuration condition corresponding to an output color that matches or approximates an output color which is acquired through a first color predictor from color data subjected to total color material amount restriction processing which is acquired by total color material amount restriction processing using a first total color material amount restriction profile, based on the first total color material amount restriction profile, the first color predictor and the second color predictor, where: the first total color material amount restriction profile defines a correspondence relationship between color data prior to total color material amount restriction processing before the total color material amount restriction processing used in the color management system processing is implemented and the color data subjected to total color material amount restriction processing which is acquired by the total color material amount restriction processing, under a first configuration condition of the image formation apparatus; the first color predictor defines a correspondence relationship between the color data subjected to total color material amount restriction processing and an output color output from the image formation apparatus, under the first configuration condition of the image formation apparatus; and the second color predictor defines a correspondence relationship between color data based on an image signal input to the image formation apparatus and an output color output from the image formation apparatus, under the second configuration condition of the image formation apparatus; and a profile creation device which associates the color data searched and acquired under the second configuration condition and the color data prior to total color material amount restriction processing and creates a second total color material amount restriction profile.

Another aspect of the present invention relates to a non-transitory recording medium in which computer-readable code of a program is stored, wherein the program is a program that causes a computer to execute a procedure of creating a total color material amount restriction profile used in image signal processing which creates an image signal supplied to an image formation apparatus and which includes color management system processing using a common printer profile and total color material amount restriction processing using a total color material amount restriction profile after the color management system processing, and wherein the procedure comprises: a step of acquiring a first total color material amount restriction profile that defines a correspondence relationship between color data prior to total color material amount restriction processing before the total color material amount restriction processing used in the color management system processing is implemented and color data subjected to total color material amount restriction processing which is acquired by the total color material amount restriction processing, under a first configuration condition of the image formation apparatus; a step of acquiring a first color predictor that defines a correspondence relationship between the color data subjected to total color material amount restriction processing and an output color output from the image formation apparatus, under the first configuration condition of the image formation apparatus; a step of acquiring a second color predictor that defines a correspondence relationship between color data based on an image signal input to the image formation apparatus and an output color output from the image formation apparatus, under a second configuration condition of the image formation apparatus; a step of searching and acquiring, through the second color predictor, color data under the second configuration condition corresponding to an output color that matches or approximates an output color which is acquired through the first color predictor from the color data subjected to total color material amount restriction processing which is acquired by total color material amount restriction processing using the first total color material amount restriction profile; and a step of associating the color data searched and acquired under the second configuration condition and the color data prior to total color material amount restriction processing and creating a second total color material amount restriction profile.

Another aspect of the present invention relates to an image signal processing apparatus which creates an image signal supplied to an image formation apparatus and which includes the above-mentioned total color material amount restriction profile creation apparatus.

Another aspect of the present invention relates to an image signal processing system which creates an input signal supplied to an image formation apparatus, from an image signal, the system includes: a color management system processing unit which acquires color data subjected to color management system processing by applying color management system processing using a common printer profile to the input signal; and a total color material amount restriction processing unit which acquires color data subjected to total color material amount restriction processing by applying total color material amount restriction processing using a total color material amount restriction profile to the color data subjected to color management system processing, in which: the total color material amount restriction processing unit performs total color material amount restriction processing using a first total color material amount restriction profile that defines a correspondence relationship between the color data subjected to color management system processing and the color data subjected to total color material amount restriction processing, under a first configuration condition of the image formation apparatus, in a case where the image formation apparatus performs image formation under the first configuration; and the total color material amount restriction processing unit performs total color material amount restriction processing using a second total color material amount restriction profile created by the above-mentioned total color material amount restriction profile creation method, in a case where the image formation apparatus performs image formation under a second configuration condition.

Preferably, the image signal processing system further includes a multivalued processing unit which applies multivalued processing to the color data subjected to total color material amount restriction processing.

In this case, it is possible to perform multivalued processing on the CMYK data to which the color management system processing and the total color material amount restriction processing are applied, and the image formation apparatus can perform image formation based on this CMYK data subjected to multivalued processing.

As the multivalued processing described herein, there is processing based on, for example, the halftoning method (which may include the dither method and the error diffusion method), and it may include not only processing of being able to represent a plurality of sizes of unit dots formed on a recording medium by the image formation apparatus but also processing of creating a so-called binarized image based on ON/OFF of dots.

Preferably, the image signal processing system further includes a configuration determination unit which determines whether the image signal supplied to the image formation apparatus is based on the first configuration condition or whether the image signal is based on the second configuration condition, in which the total color material amount restriction processing unit performs the total color material amount restriction processing using a total color material amount restriction profile based on a determination result in the configuration determination unit.

In this case, it is possible to perform appropriate total color material amount restriction processing according to the configuration in the image formation apparatus.

Preferably, the image signal processing system further includes a multivalued processing unit which applies multivalued processing to the color data subjected to total color material amount restriction processing, in which the multivalued processing unit applies multivalued processing based on a determination result in the configuration determination unit to the color data subjected to total color material amount restriction processing.

In this case, it is possible to perform appropriate multivalued processing according to the configuration in the image formation apparatus.

According to the present invention, under both conditions of the first configuration condition and second configuration condition of an image formation apparatus, it is possible to create a total color material amount restriction profile for that under the second configuration condition (i.e., second total color material amount restriction profile) so as to be able to perform color management system processing using a common printer profile.

By this means, in the case of creating a printer profile on the user side of an image formation apparatus, even when the configuration of the image formation apparatus is changed or added or the image formation apparatus has a plurality of configurations, since it is possible to use a common printer profile and it is not necessary to make a printer profile for each configuration, it is possible to reduce the user's load.

BRIEF DESCRIPTION OF THE DRAWINGS

FIG. 10 is a flowchart illustrating a creation processing process of total color material amount restriction profile B for configuration B;

FIGS. 11A and 11B are diagrams illustrating the relationships between printer profiles and total color material amount restriction profiles for configurations A and B, in which FIG. 11A illustrates a printer profile and a total color material amount restriction profile for configuration A, and FIG. 11B illustrates a printer profile and a total color material amount restriction profile for configuration B.

DETAILED DESCRIPTION OF THE PREFERRED EMBODIMENTS

In the following, embodiments of the present invention are described with reference to the accompanying drawings.

First, an explanation is given to an outline of a premised image signal processing system in a case where a single system configuration is provided (see FIG. 1 to FIG. 7), and after that, an explanation is given to a case where a plurality of system configurations are applied to a printer system (e.g., image printing unit) (see FIG. 8 to FIG. 12).

The following embodiments target a printer system using four kinds of color materials of cyan (C), magenta (M), yellow (Y) and black (K). Here, the type and color materials (e.g., type and number) of the printer system are not especially limited, and the following embodiments are applicable without depending on the type of the printer system. Therefore, as a printer system, for example, it is possible to use an offset printing machine, an electrophotographic image, an ink jet printer, and so on, and as a color material, it is possible to use an ink, toner, and so on, according to a printer system.

Figure 1:
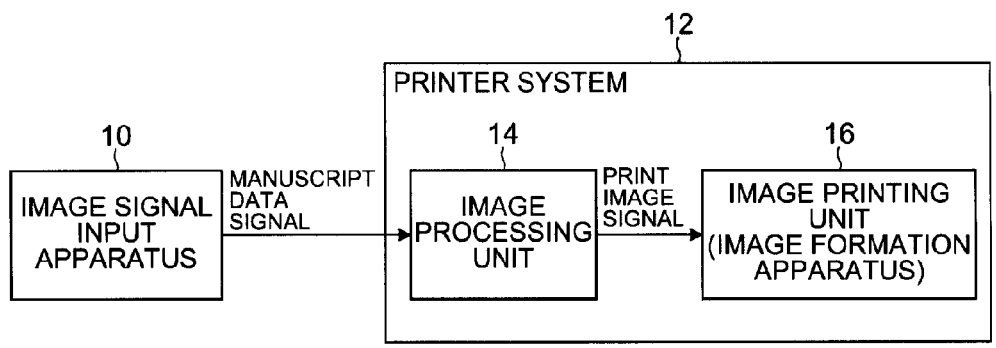
FIG. 1 is a block diagram illustrating an outline of input/output signals in an image signal input apparatus and a printer system.

FIG. 1 is a block diagram illustrating an outline of input/output signals at the time of image printing.

In a case where image printing is performed in a printer system 12, an image signal input apparatus 10 configured by a computer or the like is connected to the printer system 12, and a manuscript data signal including CMYK data and RGB data is sent from the image signal input apparatus 10 to the printer system 12.

The image signal input apparatus 10 creates and adjusts image data (e.g., drawing data and character/line-drawing data) that is the origin of a printed image, and sends a single including CMYK data and RGB data of this image data to an image processing unit 14 as a manuscript data signal.

The image processing unit 14 of the printer system 12 performs a series of image processing described later, on the input manuscript data signal, creates a print image signal and transmits the print image signal to an image printing unit 16 in a subsequent stage. The image printing unit 16 ejects a CMYK ink on the basis of the printed image subjected to image processing in the image processing unit 14, and forms an image on a recording medium such as a sheet of paper.

Here, in the example illustrated in FIG. 1, although the printer system 12 is formed by integrally providing the image processing unit 14 and the image printing unit 16, an embodiment of the image signal input apparatus 10, the image processing unit 14 and the image printing unit 16 is not especially limited. Therefore, the image signal input apparatus 10, the image processing unit 14 and the image printing unit 16 may be provided integrally or provided separately, and for example, the image processing unit 14 may be provided integrally with or separately from the image signal input apparatus 10 and/or the image printing unit 16.

Figure 2:
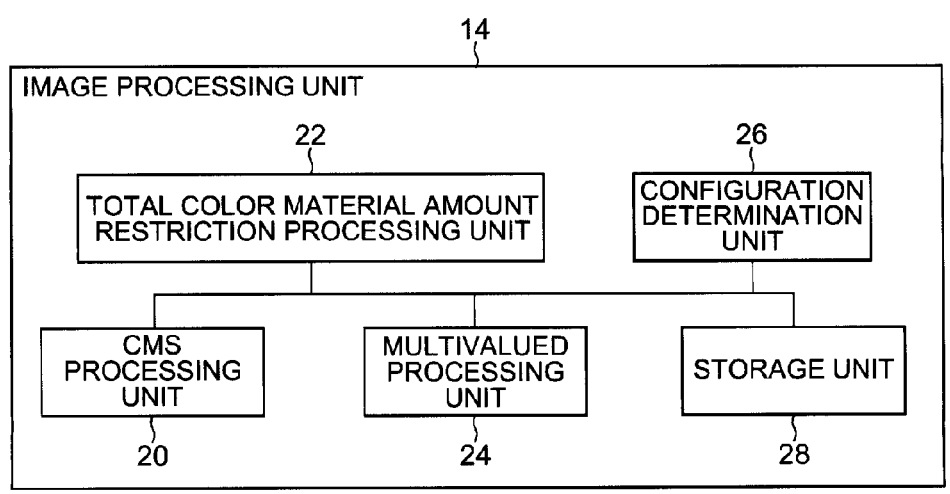
FIG. 2 is a block diagram illustrating a functional configuration of an image processing unit of the printer system.

FIG. 2 is a block diagram illustrating a functional configuration of the image processing unit 14. The image processing unit 14 is an image signal processing unit that creates a print image signal supplied to the image printing unit 16, and includes a CMS (color management system) processing unit 20, a total color material amount restriction processing unit 22, a multivalued processing unit 24, a configuration determination unit 26 and a storage unit 28.

The CMS processing unit 20 performs color management system processing (i.e., CMS processing) using a printer profile in order to unify display colors between devices that handle an image, and performs image data conversion through the color reproduction area that does not depend on the devices. For example, in a case where a manuscript data signal is based on "data (for example, CMYK data, RGB data, and so on) subjected to color representation based on a color space depending on the image signal input apparatus 10," the CMS processing unit 20 performs conversion processing of the above data into corresponding "color representation data (CMYK data) based on a color space depending on the printer system 12" through "data subjected to color representation in a device-independence color space (CIE Lab (which may be referred to as "L*a*b*" below)." By this CMS processing, even if the image signal input apparatus 10 and the printer system 12 with different color representation characteristics are connected, it is possible to perform unified color representation in each device.

The total color material amount restriction processing unit 22 performs total color material amount restriction processing using a total color material amount restriction profile (e.g., four-dimensional conversion profile) with respect to the CMYK data from the CMS processing unit (i.e., the CMYK data subjected to CMS processing and CMYK data prior to total color material amount restriction processing) so as to restrict the total amount of color materials provided onto a recording medium.

Generally, in a case where four kinds of color materials (CMYK) are excessively used, a recording medium cannot absorb color materials that are provided in a superimposed manner, and therefore correct patch color reproduction cannot be performed, the decrease in the membrane properties by excessive color materials is caused, and a sheet of paper is warped by an excessive ink to cause a problem during medium conveyance. Therefore, when image printing is performed on the basis of CMYK data subjected to CMS processing in which total color material restriction is not performed, an excessive color material amount is provided from the image printing unit 16 onto a recording medium, and there may arise the above-mentioned problem. The total color material amount restriction processing unit 22 performs total color material amount restriction processing on CMYK data subjected to CMS processing in order to avoid such excessive supply of color materials. As an example of this total color material amount restriction processing method, there is a method of using a total color material amount restriction profile. In this method, an output signal value in which a CMYK data value is restricted so as not to make the total value excessive with respect to a combination of CMYK data of an input signal value, is defined as a table (i.e., profile), and by referring to this profile, the CMYK value after the total color material amount restriction with respect to a combination of arbitrary CMYK values is found.

The multivalued processing unit 24 performs multivalued processing on the CMYK data subjected to total color material amount restriction processing, and based on a so-called halftoning method, changes the CMYK data from the total color material amount restriction processing unit 22 (i.e., CMYK data subjected to total color material amount restriction processing) into a data format corresponding to the printer system of the image printing unit 16. The multivalued processing described herein is widely interpreted, and not only processing of representing the unit dot size like small/medium/large dots but also processing of creating a so-called binary image based on the ON/OFF of a dot are included in the multivalued processing described herein.

The configuration determination unit 26 determines a configuration of the printer system in the image printing unit 16. The configuration of this printer system is defined by an element that may influence the relationship between an input signal and an output color, and for example, the configuration is changed when the halftoning method, the used color material type or the like is changed in the multivalued processing unit 24. Here, the relationships between the configuration of the image printing unit 16 determined in the configuration determination unit 26, the CMS processing in the CMS processing unit 20 and the total color material amount restriction processing in the total color material amount restriction processing unit 22 are described later in detail.

The storage unit 28 stores data (e.g., program, data, and so on) required for image processing in the image processing unit 14, and each part of the image processing unit 14 can adequately access (i.e., read and rewrite) the data stored in the storage unit 28. For example, the storage unit 28 stores and holds a target profile and printer profile used in the CMS processing in the CMS processing unit 20, a total color material amount restriction profile used in the total color material amount restriction processing unit 22, and so on.

Figure 3:
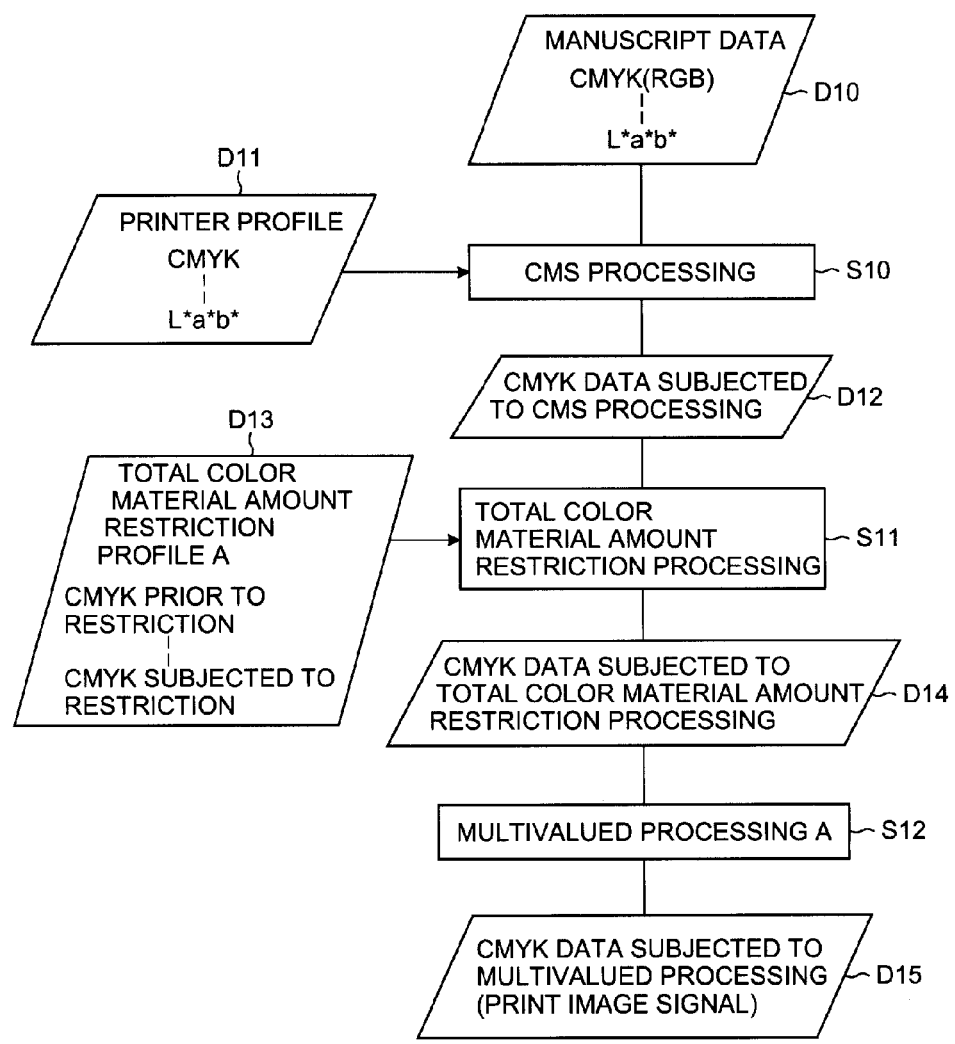
FIG. 3 is a flowchart illustrating the flow of signal processing in the image processing unit and illustrates a processing flow especially in a case where the printer system adopts a single configuration (configuration A)

FIG. 3 is a flowchart indicating the flow of signal processing in the image processing unit 14, and especially illustrates a processing flow in a case where the printer system adopts a single configuration (configuration A).

A manuscript data signal (D10 in FIG. 3) sent from the image signal input apparatus 10 to the printer system 12 is subjected to CMS processing based on a printer profile (D11) in the CMS processing unit 20 of the image processing unit 14

(S10), and CMYK data subjected to CMS processing (D12) is output from the CMS processing unit 20.

This CMYK data subjected to CMS processing is subjected to total color material amount restriction processing based on total color material amount restriction profile A (D13) for configuration A in the total color material amount restriction processing unit 22 (S11), and CMYK data subjected to total color material amount restriction processing (D14) is output from the total color material amount restriction processing unit 22.

This CMYK data subjected to total color material amount restriction processing is subjected to multivalued processing A for configuration A in the multivalued processing unit 24 (S12), and the CMYK data subjected to multivalued processing (D15) is output from the multivalued processing unit 24.

The CMYK data multivalued in this way is sent from the image processing unit 14 to the image printing unit 16 as a print image signal, and served to image printing in the image printing unit 16.

According to the above-mentioned image processing process illustrated in FIG. 3, since a trouble due to a difference in the color representation characteristics between devices can be overcome by the CMS processing and the excessive supply of color materials can be prevented by the total color material amount restriction processing, it is possible to form a high-resolution image.

Here, since the example illustrated in FIG. 3 targets a case where the printer system adopts a single configuration (configuration A), although configuration determination (by the configuration determination unit 26) is not performed, the configuration determination is performed in a case where the printer system adopts a plurality of configurations. A case where the image printing unit 16 adopts a plurality of configurations is described later (see FIG. 12).

Figure 4:
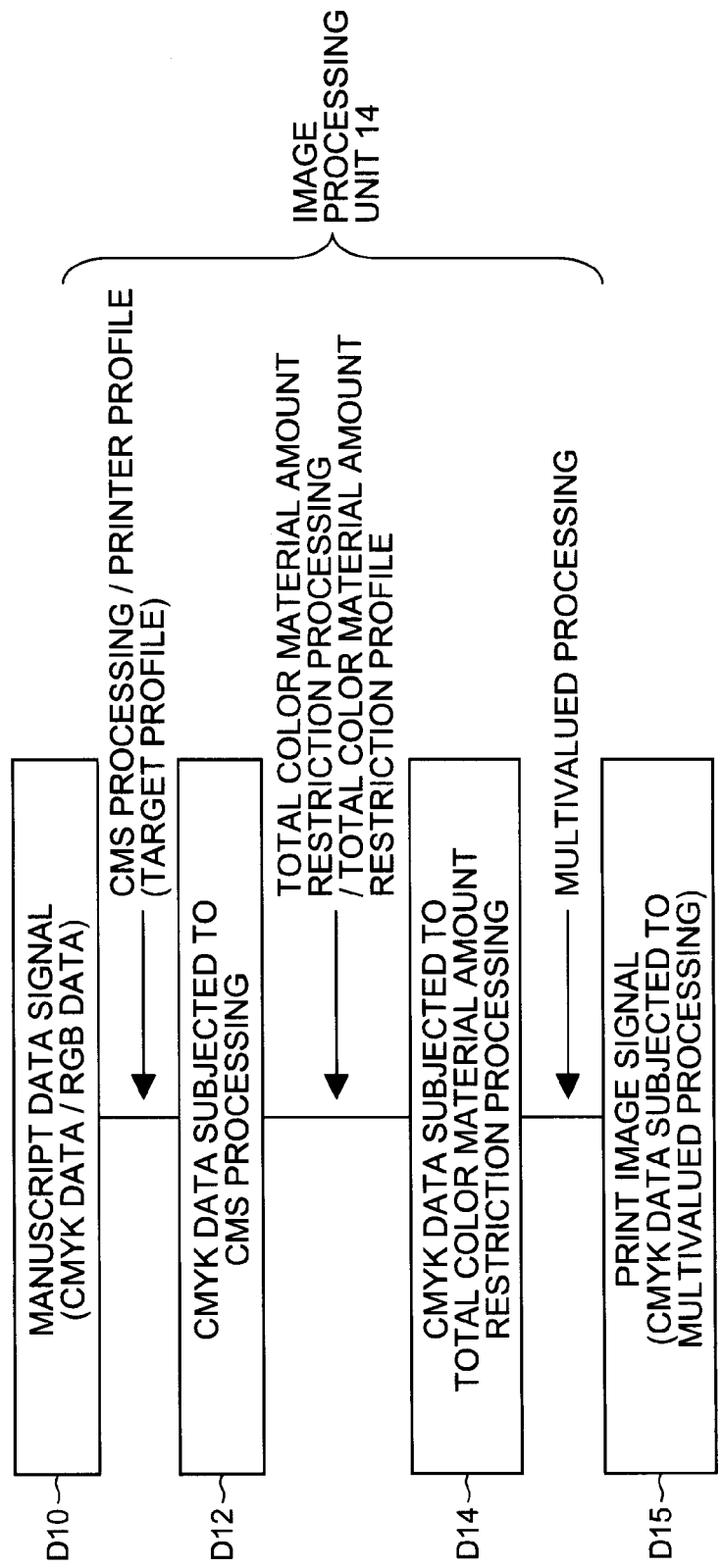
FIG. 4 is a block diagram illustrating a flow of data based on the processing flow in FIG. 3.

FIG. 4 is a block diagram illustrating the data types based on the processing flow illustrated in FIG. 3. As described above, first, manuscript data (e.g., CMYK data, RGB data, and so on) D10 represented on a device dependence color space is converted into CMYK data subjected to CMS processing D12 through CMS processing based on a printer profile (and a target profile).

When the manuscript data D10 includes color data with only data (e.g., CMYK data, RGB data, and so on) expressed on the device dependence color space, correspondence color data (e.g., L*a*b* data, and so on) in a device non-dependence color space is acquired on the basis of the target profile, and CMS processing is subsequently performed. Meanwhile, when the manuscript data D10 includes not only data (e.g., CMYK data, RGB data, and so on) expressed on the device dependence color space but also color data (e.g., L*a*b* data, and so on) expressed on a corresponding device non-dependence color space (see D10 in FIG. 3), it is possible to perform CMS processing directly using a printer profile without using a target profile.

As illustrated in FIG. 4, the CMYK data subjected to CMS processing D12 is converted into CMYK data subjected to total color material amount restriction processing D14 in which the total color material amount is restricted, through the total color material amount restriction processing based on the total color material amount restriction profile. Subsequently, by performing multivalued processing on this CMYK data subjected to total color material amount restriction processing D14, CMYK data subjected to multivalued processing D15 is created. This CMYK data subjected to multivalued processing D15 is sent to the image printing unit 16 in a subsequent stage as a print image signal.

Next, the CMS processing and the total color material amount restriction processing are described in detail.

Figure 5:
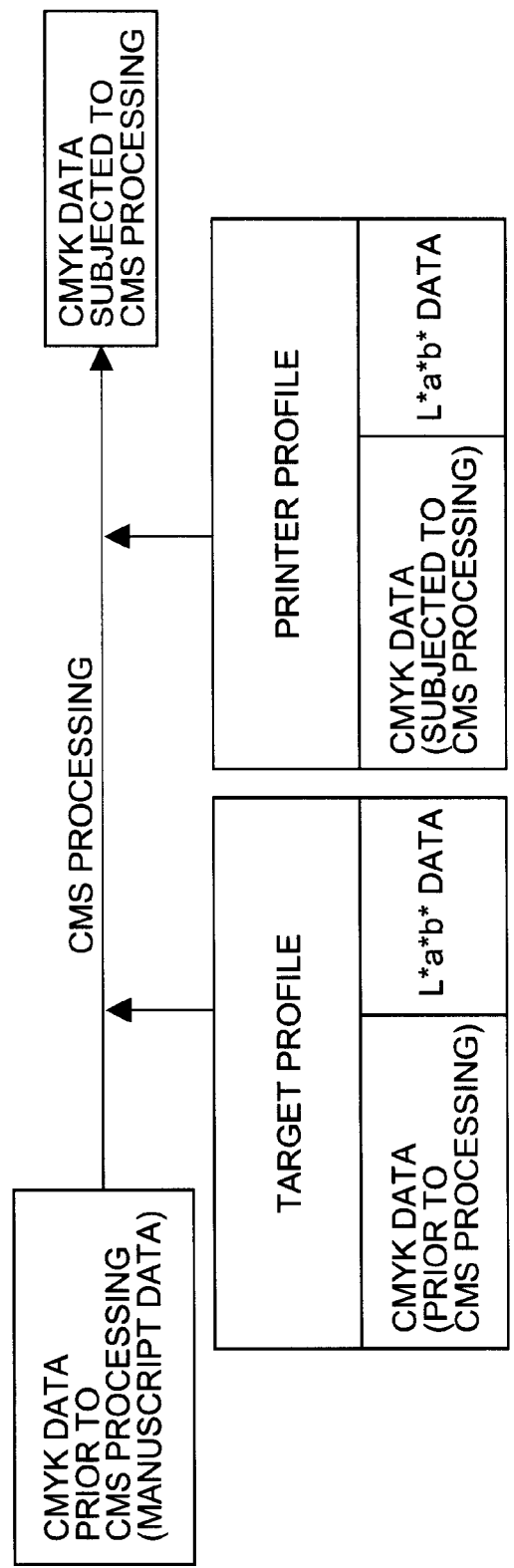
FIG. 5 is a block diagram illustrating a concept of CMS processing using a printer profile.

FIG. 5 is a block diagram illustrating a concept of the CMS processing using a printer profile, where manuscript data is CMYK data.

A target profile and a printer profile are applied in the CMS processing to manuscript data (i.e., CMYK data prior to CMS processing) input to the printer system 12, and CMYK data subjected to CMS processing is created.

The target profile of this example is a data set in which CMYK data that is device dependence color data, and L*a*b* that is device non-dependence color data, in the image signal input apparatus 10, are associated, and defines the relationship between "the CMYK data and the L*a*b*" based on the color reproduction characteristics of the image signal input apparatus 10. Meanwhile, the printer profile is a data set in which CMYK data that is device dependence color data, and L*a*b* that is device non-dependence color data, in the printer system 12, are associated, and defines the relationship between "the CMYK data and the L*a*b*" based on the color reproduction characteristics of the printer system 12 (i.e., the image printing unit 16).

In the CMS processing of this example, first, L*a*b* data corresponding to the CMYK data of manuscript data (i.e., CMYK data prior to CMS processing) is acquired with reference to the target profile. Subsequently, "CMYK data defined by the printer profile" corresponding to "CMYK data defined by the target profile" is specified on the basis of L*a*b* that is device non-dependence color data. Thus, the manuscript data (i.e., CMYK data) is converted into CMYK data subjected to CMS processing.

Figure 6:
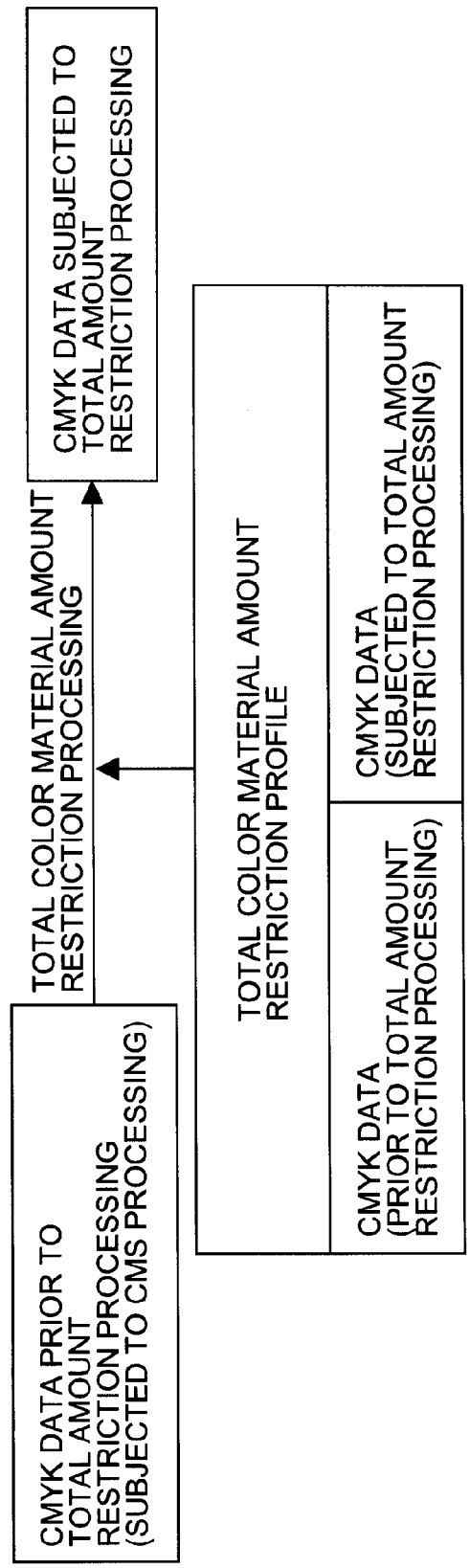
FIG. 6 is a block diagram illustrating a concept of total color material amount restriction processing using a total color material amount restriction profile.

FIG. 6 is a block diagram illustrating a concept of total color material amount restriction processing using a total color material amount restriction profile.

In the total color material amount restriction processing, the total color material amount restriction profile is applied to CMYK data (i.e., CMYK data prior to total color material amount restriction processing) which is acquired by CMS processing, and CMYK data subjected to total color material amount restriction processing is acquired.

The total color material amount restriction profile is a data set in which CMYK data not subjected total color material amount restriction and CMYK data subjected to the total color material amount restriction processing are associated. In the total color material amount restriction processing, CMYK data subjected to total color material amount restriction processing, which corresponds to CMYK data prior to total color material amount restriction processing, is acquired with reference to the total color material amount restriction profile.

Figure 7:
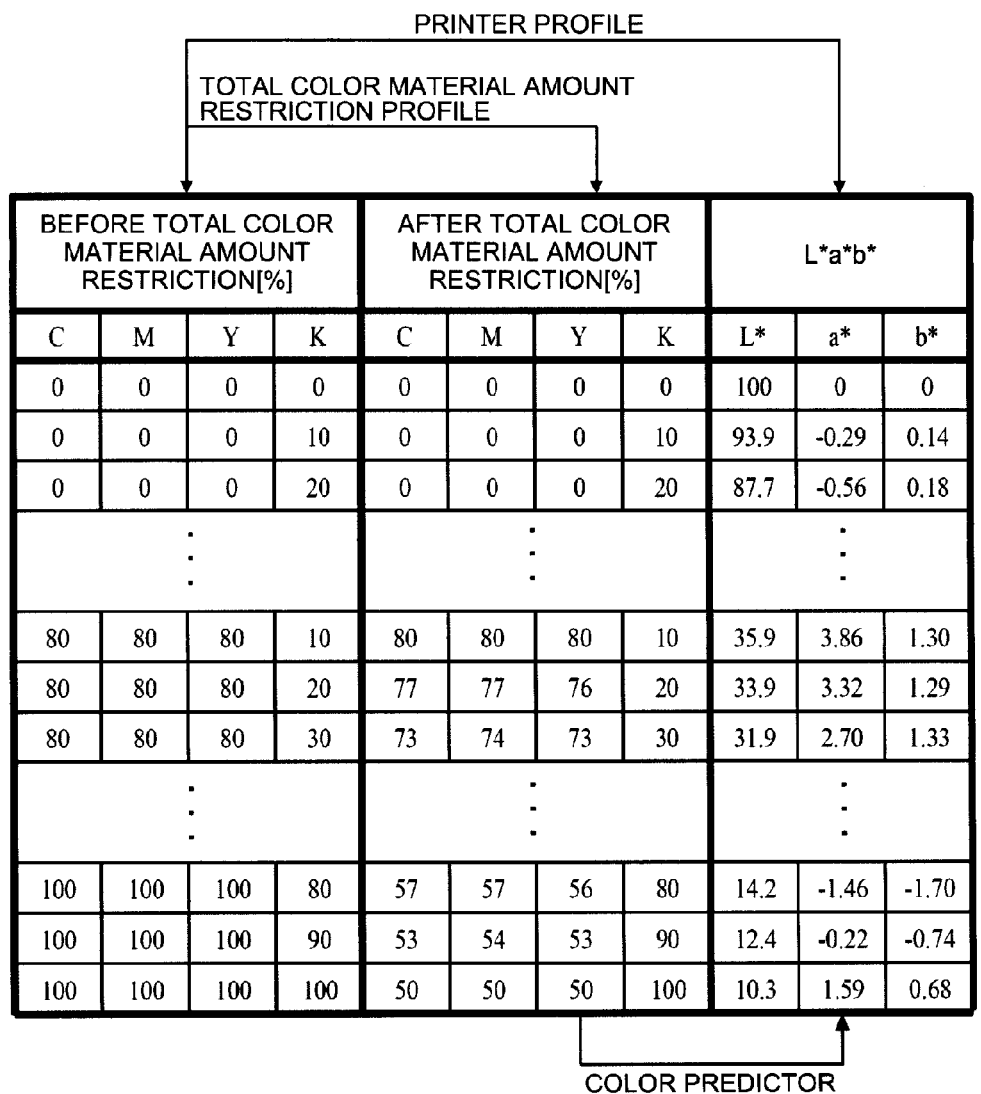
FIG. 7 is a diagram illustrating one example of the relationships between "a printer profile and a total color material amount restriction profile" and "CMYK data prior to total color material amount restriction processing, CMYK data subjected to total color material amount restriction processing and L*a*b* data"

FIG. 7 is a diagram illustrating one example of the relationships between "a printer profile and a total color material amount restriction profile" and "CMYK data prior to total color material amount restriction processing, CMYK data subjected to total color material amount restriction processing and L*a*b* data." In FIG. 7, each color data of CMYK before/after the total color material amount restriction processing is shown within the range of 0 to 100%, and L*a*b* data is shown by the value of L*a*b* color space coordinates.

The total color material amount restriction profile is defined as a table (i.e., profile) that associates the CMYK data before/after the total color material amount restriction processing, as illustrated in FIG. 7. As for specific total color material amount restriction processing, for example, it is possible to define CMYK data subjected to total color material amount restriction processing such that the total value (%) of CMYK data stays within a predetermined numerical value and the color data of a specific color (one color or multiple colors) does not exceed a predetermined value. Moreover, by changing data of a color using a specific color in CMYK data as a fixed value, it is possible to define CMYK data subjected to total color material amount restriction processing.

For example, in the example illustrated in FIG. 7, the CMYK data prior to total color material amount restriction processing is represented by the total value of 400% at maximum, and the CMYK data subjected to total color material amount restriction processing is defined such that K data before/after the total color material amount restriction processing is set to a common fixed value, other CMY data is varied and the total value (%) of the CMYK data does not exceed 250(%). The CMYK data subjected to total color material amount restriction processing is defined such that colors closer to colors reproduced by the CMYK data prior to total color material amount restriction processing are reproduced.

The CMYK data subjected to total color material amount restriction processing can be acquired in advance by experiment or simulation using a colorimetric device, and the data can be adequately defined taking into consideration various elements such as a system configuration, color materials (e.g., type and number) and the recording medium type.

Here, in a case where a combination of desired CMYK data is not directly defined in the total color material amount restriction profile, by performing interpolation processing using a neighborhood value, it is possible to find CMYK data subjected to total color material amount restriction processing, with respect to arbitrary CMYK data.

Moreover, in the example illustrated in FIG. 7, although the interval width of input CMYK data of the total color material amount restriction profile (CMYK data prior to total color material amount restriction processing) is set to 10%, the interval width is not limited to a value of 10%. By setting the interval width to a large value, there is an advantage that it is possible to reduce the file size of the total color material amount restriction profile, and by setting the interval width to a small value, there is an advantage that it is possible to enhance the interpolation accuracy.

Meanwhile, the printer profile is a profile such as LUT in which CMYK data prior to total color material amount restriction processing and L*a*b* data of an output color from the image printing unit 16 are associated. Therefore, in a case where the total color material amount restriction processing is performed after the CMS processing like this example, L*a*b* data based on the CMYK data subjected to total color material amount restriction processing is associated with the CMYK data prior to total color material amount restriction processing, in the printer profile. By this means, even in a case where the total color material amount restriction processing is performed after the CMS processing, it is possible to reproduce a desired color by the image printing unit 16 by properly performing the CMS processing.

When L*a*b* data of the printer profile is acquired from the CMYK data subjected to total color material amount processing, a color predictor is used.

The color predictor is software that predicts an output color (e.g., the device non-dependence value such as L*a*b*) with respect to input CMYK signals in a printer system (i.e., the printer system 12), for example, it is possible to create the predictor by the following method. First, color chart data formed with a plurality of patch groups defined by changing the CMYK data at intervals of 10% is created, and the color chart is output from the printer system. Next, the L*a*b* value of the output color chart is subjected to color measurement by the colorimetric device.

By this means, regarding forward mapping, it is possible to calculate L*a*b* data with respect to the CMYK data at intervals of 10%. Moreover, it is possible to predict other CMYK data by using an interpolation calculation or the like. At this time, without using a simple interpolation calculation, it is possible to use a physical model such as the Neugebauer model and the Yule-Nielsen-corrected Neugebauer model. By using an appropriate physical model, as compared with a case where a simple interpolation calculation is performed, it is possible to perform accurate color prediction by the measurement values of fewer patch groups.

In the above-mentioned example, although the patch groups corresponding to learning data for color prediction are defined by the CMYK data at intervals of 10%, the interval width is not limited to 10%. By setting the interval width to a large value, there is an advantage that it is possible to reduce the file size of the printer profile, and by setting the interval width to a small value, there is an advantage that it is possible to enhance the interpolation accuracy. Therefore, if the color prediction accuracy is requested to be improved, it may be set to intervals of 5%, and if the number of measurement steps is requested to be decreased, for example, it may be possible to exercise ingenuity such that important colors such as the skin color and the gray are preferentially selected (i.e., the interval width is shortened) and the interval width of other colors is lengthened.

As described above, when the sum (%) of CMYK data becomes too large, a recording medium cannot absorb color materials that are provided in a superimposed manner, and therefore correct patch color reproduction cannot be performed, the decrease in membrane properties by excessive color materials is caused, and a sheet of paper is warped by excessive color materials to cause a problem during medium conveyance. To cope with these, in a case where the sum (%) of CMYK data is large, it is preferable not to create a patch and perform printing. In this case, although L*a*b* data with respect to the CMYK data is not found, since this area is not suitable for printing, there are many cases where it is not necessary to acquire L*a*b* data. In a case where these items of data are necessary for the convenience of the system, they may be found by extrapolation calculation or otherwise suitable values may be substituted to clarify that they are error values.

According to the CMS processing using the printer profile and the above-mentioned image processing system including the total color material amount restriction processing using the total color material amount restriction profile, even if a user creates a printer profile unique to the user, the total color material amount restriction processing can be made a black box in view of the user side.

When the above-mentioned printer system (i.e., the printer system 12) is operated in advance by configuration A (i.e., a first configuration) and when there are color predictor A (i.e., a first color predictor) for configuration A and total color material amount restriction profile A (i.e., a first total color material amount restriction profile), by creating a printer profile corresponding to total color material amount restriction profile A, it is possible to adequately perform color management.

At a later date, it is assumed that new configuration B (i.e., a second configuration) is introduced into the printer system by some reason (for example, in order to improve the image quality). For example, the new configuration may include the change in the print mechanism by the change in multivalued processing, the addition of multivalued processing, the change in color material types, and so on. When this new configuration B is introduced, an output color with respect to an input signal of the printer system changes from that in the case of configuration A. Therefore, even if total color material amount restriction profile A is used in the printer system that adopts configuration B, it is not possible to perform accurate color management unless the printer profile is created again. However, the number of steps such as the output and measurement of a color patch increases in order to create a printer profile again, which burdens the user.

Then, by creating new total color material amount restriction processing table B (i.e., a second total color material amount restriction profile) so as to absorb the difference between configuration B and configuration A caused by introducing new configuration B, it is possible to reuse (i.e., share) a printer profile used at the time of CMS processing.

In the following, an explanation is given to the creation of the total color material amount restriction profile with respect to new configuration B.

Figure 8:
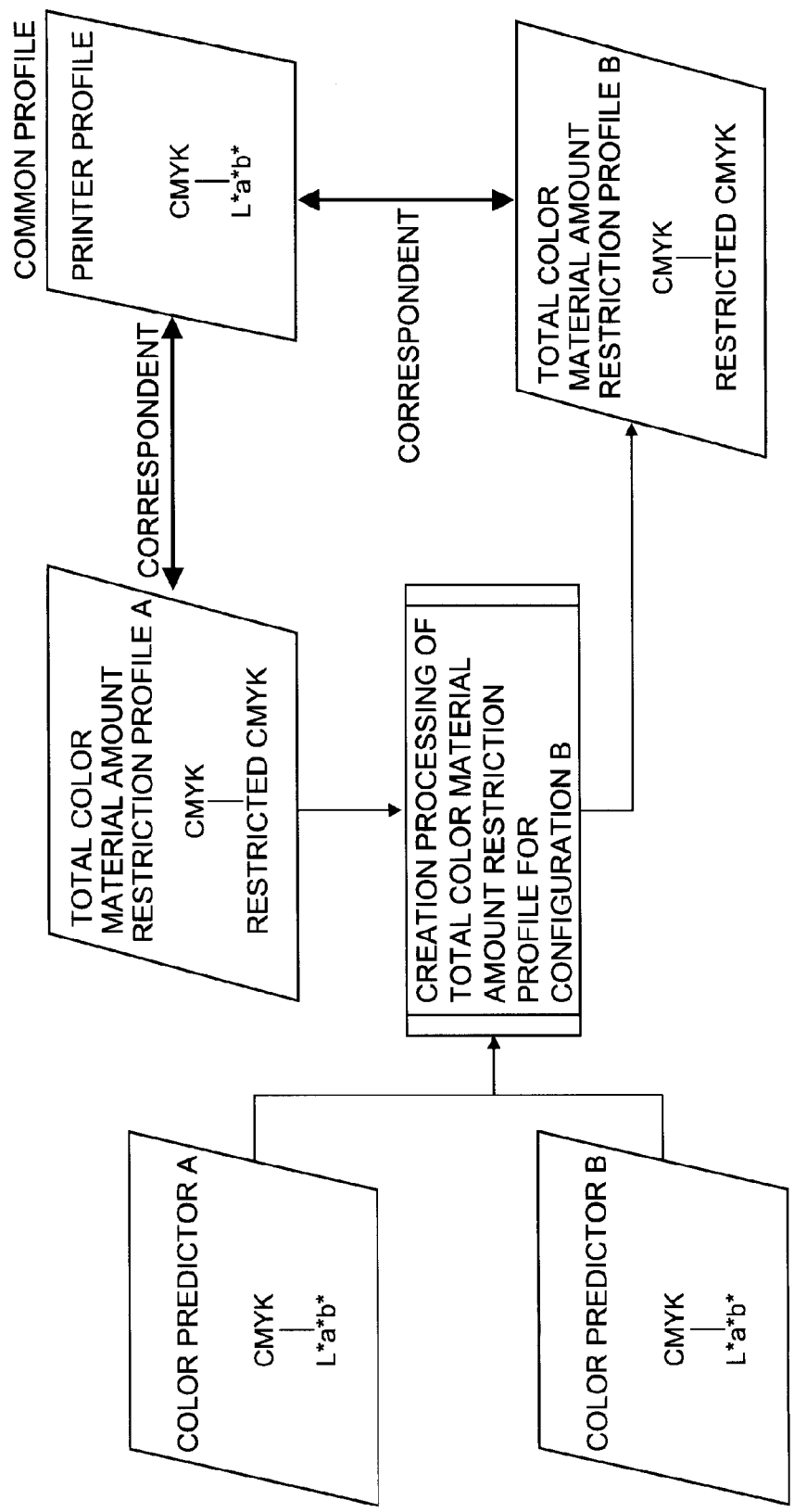
FIG. 8 is a conceptual diagram illustrating the relationship between a color predictor and a total color material amount restriction profile, which relates to creation processing of a total color material amount restriction profile for configuration B.

FIG. 8 is a conceptual diagram illustrating the relationship between a color predictor and a total color material amount restriction profile, which is related to creation processing of the total color material amount restriction profile for configuration B.

In this example, color predictor A (i.e., the first color predictor) for configuration A, total color material amount restriction profile A for configuration A and color predictor B (i.e., a second color predictor) for configuration B are used as input data, and total color material amount restriction profile B for configuration B is created. Total color material amount restriction profile B for configuration B, which is created in this way, also corresponds to a printer profile used also in the case of configuration A. Therefore, both of total color material amount restriction profile A for configuration A and total color material amount restriction profile B for configuration B can be made to correspond an existing printer profile, and it is possible to perform image processing using the common printer profile.

Figure 9:
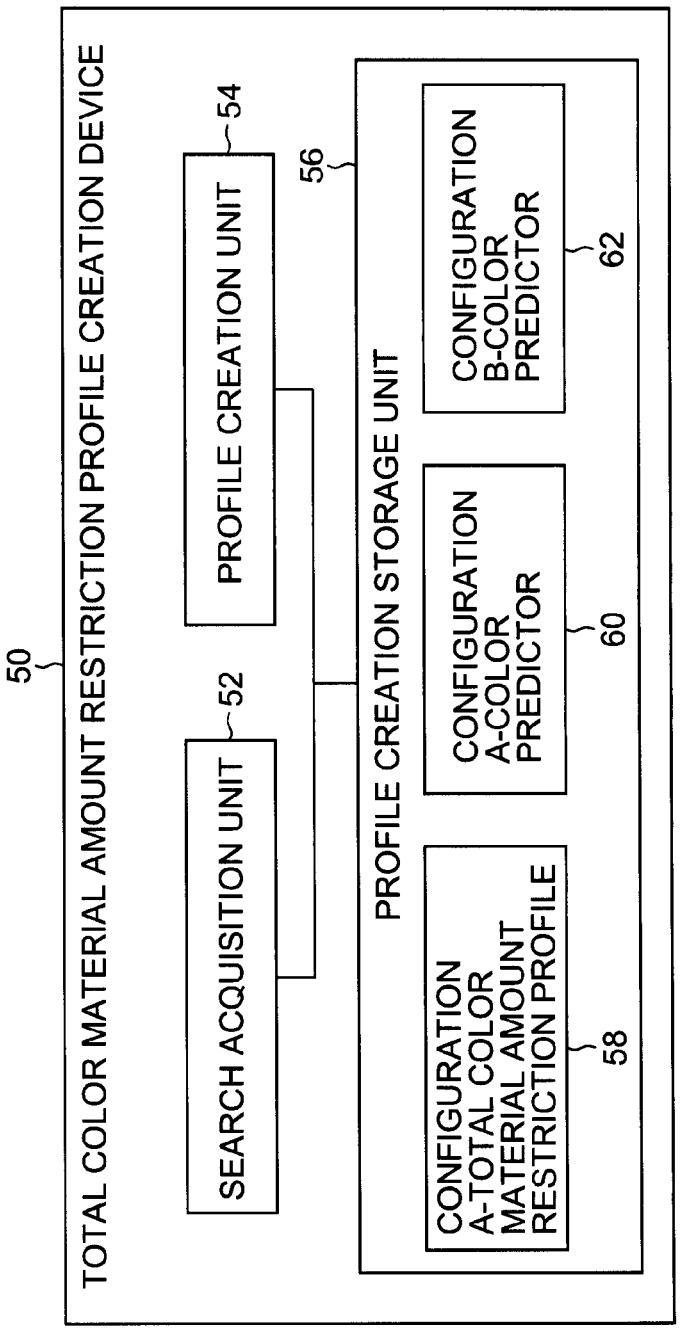
FIG. 9 is a block diagram illustrating a functional configuration of a total color material amount restriction profile creation device that creates a total color material amount restriction profile.

FIG. 9 is a block diagram illustrating a functional configuration of a total color material amount restriction profile creation device 50 that creates a total color material amount restriction profile.

The total color material amount restriction profile creation device 50 that creates a total color material amount restriction profile for configuration B includes a search acquisition unit 52, a profile creation unit 54 and a profile creation storage unit 56.

Although the search acquisition unit 52 is described later in details (see FIG. 10), it searches and acquires CMYK data subjected to total color material amount restriction processing of the total color material amount restriction profile for configuration B, by the use of a configuration A-total color material amount restriction profile 58 stored in the profile creation storage unit 56, a configuration A-color predictor 60 and a configuration B-color predictor 62.

The profile creation unit 54 associates CMYK data subjected to total color material amount restriction processing for configuration B searched and acquired by the search acquisition unit 52 and CMYK data subjected to CMS processing (i.e., CMYK data prior to total color material amount restriction processing), and creates a total color material amount restriction profile for second configuration.

FIG. 10 is a flowchart illustrating a creation processing process of total color material amount restriction profile B for configuration B in the total color material amount restriction profile creation device 50.

<Processing 1>

First, the zero-order color is set. That is, the profile creation unit 54 sets (0,0,0,0) to output CMYK data (i.e., CMYK data subjected to total color material amount restriction processing) in a case where input CMYK data of total color material amount restriction profile B for configuration B (i.e., CMYK data prior to total color material amount restriction processing) is (0,0,0,0) (=(C data, M data, Y data and K data)) (S20 in FIG. 10).

Subsequently, the search acquisition unit 52 and the profile creation unit 54 perform loop processing to repeatedly execute the following processing 2 to processing 4 for each of all input CMYK data except for input CMYK data (0,0,0,0) set to the CMYK data subjected to total color material amount restriction processing in the above-mentioned processing 1 (S30A, S31, S32, S33 and S30B).

<Processing 2>

In this loop processing, first, L*a*b* data that is a target is predicted and acquired. That is, the search acquisition unit 52 of the total color material amount restriction profile creation device 50 acquires, from the profile creation storage unit 56, the configuration A-total color material amount restriction profile 58 (i.e., total color material amount restriction profile A) that defines the correspondence relationship between the CMYK data subjected to CMS processing, which is acquired by the CMS processing, and the CMYK data subjected to total color material amount restriction processing, which is acquired by the total color material amount restriction processing, under configuration condition A. Moreover, the search acquisition unit 52 acquires, from the profile creation storage unit 56, the configuration A-color predictor 60 (i.e., color predictor A) that defines the correspondence relationship between the CMYK data subjected to total color material amount restriction processing and output colors output from the image printing unit 16, under configuration condition A.

Subsequently, the search acquisition unit 52 refers to output CMYK data (i.e., CMYK data subjected to total color material amount restriction processing) of the configuration A-total color material amount restriction profile 58 corresponding to input CMYK data (i.e., CMYK data prior to total color material amount restriction processing) that is currently a processing target, and predicts L*a*b* data by inputting this output CMYK data in the configuration A-color predictor 60. The L*a*b* value thus acquired through color predictor A is referred to as a "prediction value A" (S31).

Here, in a case where a common printer profile used in the CMS processing is created using the configuration A-color predictor 60, since this prediction value A matches L*a*b* data of the printer profile, prediction value A may be acquired according to the relationship between CMYK data and L*a*b* data defined in the printer profile, without performing prediction by color predictor A.

<Processing 3>

Subsequently, the search acquisition unit 52 searches CMYK data that matches or approximates target L*a*b* data (i.e., prediction value A) calculated by the above-mentioned processing 2 under configuration condition B (S32). At this time, the search acquisition unit 52 acquires, from the profile creation storage unit 56, the configuration B-color predictor (i.e., color predictor B) 62 that defines the correspondence relationship between CMYK data of an image signal input in the image printing unit 16 and an output color output from the image printing unit 16, under configuration condition B. Subsequently, the search acquisition unit 52 searches and acquires CMYK data under configuration condition B through the configuration B-color predictor 62, where the CMYK data corresponds to an output color that matches or approximates an output color which is acquired from CMYK data subjected to total color material amount restriction processing through the configuration A-color predictor 60, and this CMYK data is acquired by the total color material amount restriction processing using the configuration A-total color material amount restriction profile 58.

It is an object of this example to enable a common printer profile with that for configuration A to be used even in the case of using configuration B. Therefore, if CMYK data in which L*a*b* data predicted using color predictor B for configuration B approximates (ideally matches) prediction value A predicted in processing 2 is set to output CMYK value of the total color material amount restriction profile for configuration B (i.e., CMYK data subjected to total color material amount restriction processing), it is possible to achieve this object.

Therefore, in this example, the following method is used as a unit to search for CMYK data as described above. First, it is presumed that, in a case where there is a change from configuration A to configuration B (or where configuration B is added), the relationships between input CMYK data and output colors of the image printing unit 16 do not change greatly. Under this presumption, it is considered that, if CMYK data of configuration A is adjusted in some degree, it is possible to reproduce the same output colors as those in configuration A by configuration B.

Therefore, the CMYK data subjected to total color material amount restriction processing, which is acquired by the total color material amount restriction processing using the configuration A-total color material amount restriction profile 58, is set to an initial value, and by changing at least one piece of data of the CMY data from the initial value without changing the K data from the initial value, CMYK data under configuration condition B is searched and acquired. That is, output CMYK data of total color material amount restriction profile A for configuration A (i.e., CMYK data subjected to total color material amount restriction processing) may be set to an initial value, and while the CMY data is changed step by step, CMYK data may be searched such that the prediction result in the configuration B-color predictor 62 approximates (ideally matches) the above-mentioned prediction value A.

Since the CMY data is under the restriction of the domain of 0 to 100%, this CMYK data search can be handled as a problem of restricted non-linear optimization. That is, using a non-linear optimization method with restriction, it is possible to search for and acquire the CMYK data under configuration condition B. As this non-linear optimization method with restriction, for example, it is possible to use a combination of a penalty function method and a down-hill simplex method, and by using this combined method, it is possible to search for the CMYK data subjected to total color material amount restriction processing for configuration B.

In this example, K data was fixed to the initial value, only CMY data was changed and the above-mentioned optimization method was performed. Advantages of this are as follows.

[1] Since the gray color can be represented by the process black made by the color mixture of the CMY colors without using the K color, the above-mentioned search is not wrecked.
[2] Since it is possible to adjust colors in an arbitrary hue direction if the CMY colors are used, it is easy to find a solution that gives a good approximation.
[3] Since only three colors of CMY are required instead of using four colors of CMYK, the calculation time required for optimization is shortened.
[4] Since K is fixed when various CMYK values are decided in loop processing, it is possible to reduce the risk that a tone jump between tones or an expected color change occurs.

In the above example, although all of the CMY data can be adjusted, color materials (i.e., color data) that can be adjusted may be limited according to the CMY data of the initial value. As an example, regarding the CMY data (i.e., color data) of color materials with a data value of 0 among the CMYK data used as the initial value, without adjusting and changing the data values from 0, the CMYK data under configuration condition B may be acquired. For example, in a case where the initial value (%) of the CMY data is (C,M,Y)=(0,50,45), it may be possible to adopt a method in which only the M data and the Y data are adjusted and the C data is fixed to 0. In the case of adopting this method, there is an advantage that the first color and the second color are preserved and the color properties of the printer system become more natural.

Here, in this processing 3, although the level of approximation is not especially limited in a case where the predicted result in the configuration B-color predictor 62 is approximated to the above-mentioned prediction value A, it is preferable to approximate the resultant color to the extent that the difference cannot be found at least by the visual sense, and it is preferable that the distance (i.e., color difference) on the L*a*b* color space is around "1" or less. By approximating colors to the extent that the difference cannot be found by the visual sense, it is considered that it is possible to minimize the inconvenience related to the color reproducibility in the printer system 12 on practical use.

<Processing 4>

The profile creation unit 54 sets the CMYK data derived by the optimization processing in the above-mentioned processing 3 to the CMYK data subjected to total color material amount restriction processing of the total color material amount restriction profile for configuration B, (S33). That is, "the CMYK data prior to total color material amount restriction processing which is associated with the CMYK data subjected to total color material amount restriction processing to reproduce target L*a*b* data" in total color material amount restriction profile A for configuration A and "the CMYK data for configuration B acquired by the above-mentioned processing 3 (i.e., the CMYK data subjected to total color material amount restriction processing)" are associated, and a profile that associates these data is set as a total color material amount restriction profile for configuration B.

By repeating the above-mentioned processing 2 (S31), processing 3 (S32) and processing 4 (S33) for all CMYK data (C,M,Y,K)=(0,0,0,0) to (100,100,100,100) (however, the interval width of each color data in this example is 10(%), and processing 1 is applied to (0,0,0,0)), it is possible to acquire total color material amount restriction profile B for configuration B related to all the CMYK data (S30A to S30B). Thus, the searched and acquired CMYK data under configuration condition B and the CMYK data subjected to CMS processing are associated, and total color material amount restriction profile B is created.

FIGS. 11A and 11B are diagrams illustrating the relationships between printer profiles and total color material amount restriction profiles for configurations A and B, in which FIG. 11A illustrates the printer profile and the total color material amount restriction profile for configuration A, and FIG. 11B illustrates the printer profile and the total color material amount restriction profile for configuration B.

As illustrated in FIGS. 11A and 11B, the printer profiles for configurations A and B are common. Therefore, in the CMS processing, the CMYK data subjected to CMS processing with the same value is output to input data (i.e., manuscript data signal) both in the case of configuration A and in the case of configuration B. Meanwhile, regarding the total color material amount restriction profiles, different items of CMYK data subjected to total color material amount restriction processing between configuration A and configuration B are associated for common CMYK data prior to total color material amount restriction processing. Therefore, in the total color material amount restriction processing, CMYK data subjected to total color material amount restriction processing with a different value is output to input data (i.e., CMYK data subjected to CMS processing) between the case of configuration A and the case of configuration B.

This shows that the influence due to the difference between the case of configuration A and the case of configuration B is not absorbed by the printer profile (i.e., CMS processing) but is absorbed by the total color material amount restriction profile (i.e., total color material amount restriction processing). By this means, it is possible to perform the CMS processing using the common printer profile even if the configuration of the printer system (i.e., the image printing unit 16) is configuration A or configuration B.

Next, an explanation is given to how image processing including color matching processing is performed using the printer profile and the total color material amount restriction profile.

Here, as an example, a case is considered where the printer system (i.e., the image printing unit 16) adopts configuration A in advance, multivalued processing A corresponding to this configuration A has been initially operated in a printer system, and new multivalued processing B is added to the printer system as configuration B afterward.

Figure 12:
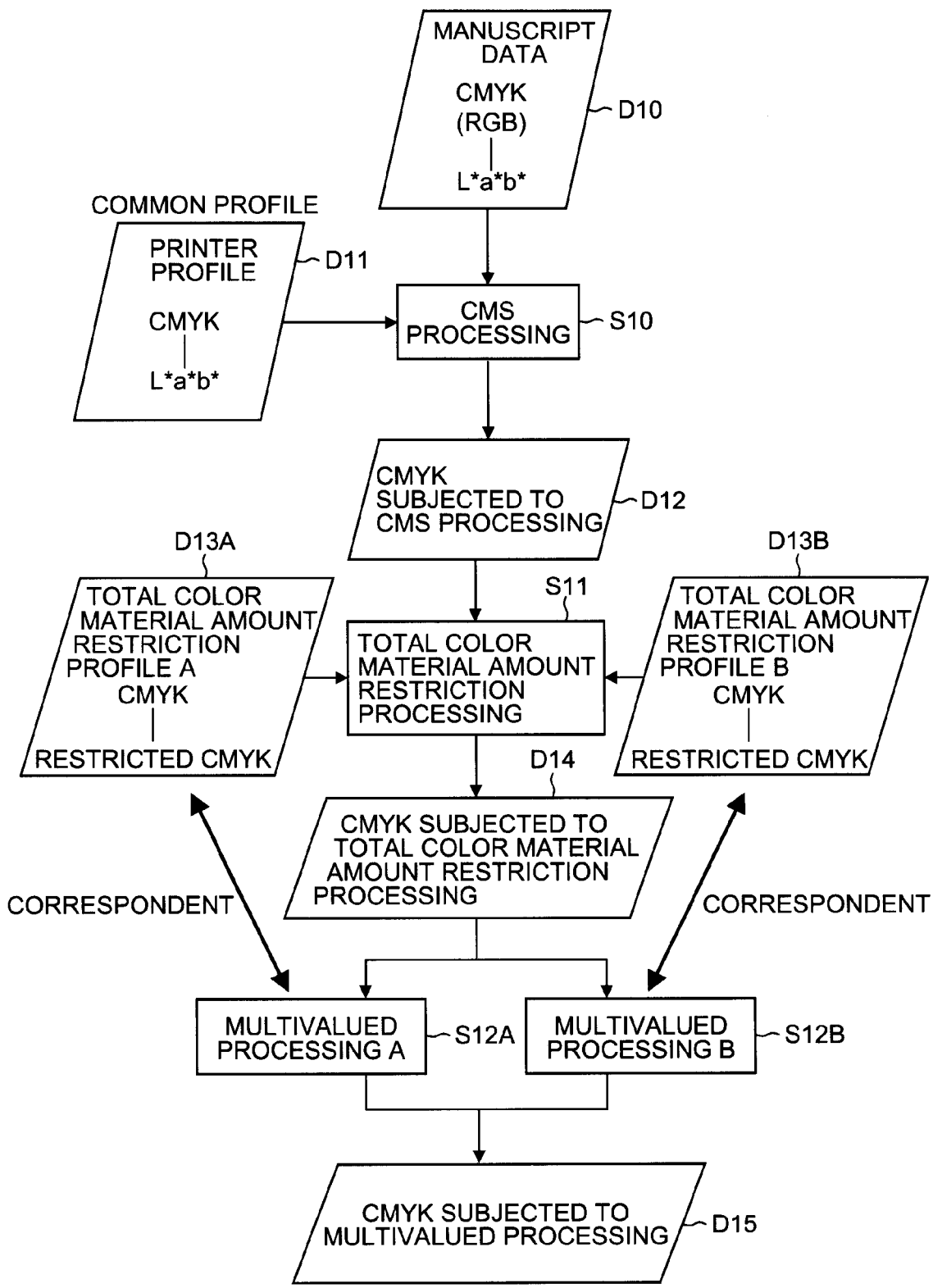
FIG. 12 is a flowchart illustrating an image processing process to selectively adopt configuration A and configuration B and create a print image signal.

FIG. 12 is a flowchart illustrating an image processing process in which configuration A and configuration B are selectively adopted to create a print image signal (i.e., CMYK data subjected to multivalued processing) with respect to the image printing unit 16 that can perform image formation.

First, processing related to configuration A is described.

It is assumed that there is manuscript data (D10 in FIG. 12) to perform printing and the manuscript data is created based on some target profiles. Although the manuscript data is CMYK data or RGB data, since it is created based on a target profile, correspondence colors in the device non-dependence color space (e.g., L*a*b*) are known. Therefore, it is possible to interpret the manuscript data as an L*a*b* data image, for example.

Meanwhile, since it is possible to find the relationship between input CMYK data and output L*a*b* data in the printer system if a printer profile (D11) is used, it is possible to perform conversion from CMYK (or RGB) data of the manuscript data into CMYK data of the printer system while L*a*b* data is saved (CMS processing S10). Here, the CMYK data (D12) of the printer system converted by the CMS processing corresponds to the CMYK data prior to total color material amount restriction.

Next, total color material amount restriction processing (S11) using total color material amount restriction profile A (D13A) is performed to convert the CMYK data prior to total color material amount restriction after the CMS processing into CMYK data subjected to total color material amount restriction (D14). Subsequently, the CMYK data subjected to total color material amount restriction is subjected to multivalued processing A (S12A) to generate multivalued image data (i.e., CMYK data subjected to multivalued processing: D15), and this CMYK data subjected to multivalued processing is sent to the image printing unit 16 as a print image signal and printed by the image printing unit 16.

Next, processing related to configuration B is described.

Total color material amount restriction profile B is created such that output colors from the image printing unit 16 at the time of using a common printer profile between the case of configuration A and the case of configuration B are approximated (or ideally matched) between the case of configuration A and the case of configuration B. Therefore, in a case where multivalued processing B for configuration B is performed, by using total color material amount restriction profile B, the color reproducibility similar to the case of configuration A can be expected even if CMS processing is performed using the common printer profile.

That is, it is similar to the case of the above-mentioned configuration A in that CMYK (or RGB) data of manuscript data (D10) for configuration B is converted into CMYK data of the printer system (i.e., CMYK data prior to total color material amount restriction: D12) by the CMS processing (S10), and a common printer profile (D11) with the case of configuration A is used in the CMS processing. Subsequently, in the total color material amount restriction processing (S11), total color material amount restriction profile B (D13B) created as above is used, and the CMYK data prior to total color material amount restriction is converted into CMYK data subjected to total color material amount restriction (D14). Subsequently, the CMYK data subjected to total color material amount restriction is subjected to multivalued processing B (S12B) for configuration B to generate multivalued image data (i.e., CMYK data subjected to multivalued processing: D15), and this CMYK data subjected to multivalued processing is sent to the image printing unit 16 as a print image signal and printed in the image printing unit 16.

Here, regarding "which of total color material amount restriction profile A for configuration A and total color material amount restriction profile B for configuration B is used in the total color material amount restriction processing" and "which of multivalued processing A for configuration A and multivalued processing B for configuration B is performed in the multivalued processing," they are based on the determination result by the configuration determination unit 26 of the image processing unit 14 (see FIG. 2). That is, in the configuration determination unit 26, it is determined on which of configuration condition A and configuration condition B a print image signal supplied to the image printing unit 16 is based. Subsequently, the total color material amount restriction processing unit 22 performs total color material amount restriction processing using a total color material amount restriction profile based on the determination result by the configuration determination unit 26, and the multivalued processing unit 24 applies multivalued processing based on the determination result by the configuration determination unit 26 to the CMYK data subjected to total color material amount restriction processing. Therefore, in a case where it is determined by the configuration determination unit 26, that the configuration of the image printing unit 16 is configuration A and the print image signal is the one based on configuration condition A, total color material amount restriction profile A for configuration A is used and multivalued processing A for configuration A is performed. Similarly, in a case where it is determined by the configuration determination unit 26, that the configuration of the image printing unit 16 is configuration B, total color material amount restriction profile B for configuration B is used and multivalued processing B for configuration B is performed.

The configuration determination unit 26 can determine a configuration of the printer system by an arbitrary method, for example, it may store and hold a configuration adopted in the printer system as information in advance or a manuscript data signal may include information as to which configuration is targeted. Therefore, for example, in a case where the configuration determination unit 26 and the image printing unit 16 are integrally provided and a single configuration of the image printing unit 16 is provided, by holding the configuration in a storage unit and referring to the storage data of the storage unit, it is possible to determine a configuration by the configuration determination unit 26. Moreover, in a case where the image printing unit 16 adopts a plurality of configurations and the image signal input apparatus 10 decides which configuration is used to perform image formation, it is possible to decide the configuration by including desired configuration information in a manuscript data signal and referring to this configuration information of the manuscript data signal.

As described above, according to the image processing process of this embodiment, it is possible to implement CMS processing by the use of a common printer profile with respect to a plurality of configurations of a printer system, while it is possible to suitably control the total color material amount assigned to a recording medium by total color material restriction processing.

By this means, even in a case where: (1) a configuration of a printer system is changed to a new configuration (i.e., configuration B) which has not been assumed at the time when the print system (i.e., printer system 12) is provided; (2) a new configuration (i.e., configuration B) is further provided in addition to an existing configuration (i.e., configuration A); or (3) even when a plurality of configurations are defined from the beginning, it is possible to share printer profiles prepared by the user and reduce the user's load without creating the printer profile for each configuration.

Especially, among the printer profile, the total color material amount restriction profile and the multivalued processing profile used in the above-mentioned image processing process, only the printer profile is operated so as to be able to be uniquely created by the user, so that, in a case where multivalued processing is changed/added according to manufacturer's convenience, it is possible for the user to save the trouble of creating a print profile again by providing a corresponding total color material amount restriction profile on the manufacturer side together with a multivalued processing profile to the user.

Also, each unit forming the above-mentioned the printer system 12 or the total color material amount restriction profile creation device 50 can be adequately realized by arbitrary hardware, software (i.e., program) or combination of these.

For example, it is also possible to realize the search acquisition unit 52 and the profile creation unit 54 of the total color material amount restriction profile creation device 50 by software, the search acquisition unit 52 and the profile creation unit 54 can be formed by a program that causes a computer to execute: a step of acquiring the configuration A-total color material amount restriction profile 58, the configuration A-color predictor 60 and the configuration B-color predictor 62 from the profile creation storage unit 56; a step of searching and acquiring CMYK data subjected to total color material amount restriction processing under configuration condition B; and a step of creating a total color material amount restriction profile for configuration B, and such a program can be recorded in a computer-readable recording medium.

Moreover, the total color material amount restriction profile creation device 50 may be provided separately from the printer system 12 or the printer system 12 may include the total color material amount restriction profile creation device 50. Moreover, the total color material amount restriction profile creation device 50 may be provided as part of the image processing unit 14 of the printer system 12 or may be provided together with the image processing unit 14.

What is claimed is:

1. A total color material amount restriction profile creation method used in image signal processing which creates an image signal supplied to an image formation apparatus and which includes color management system processing using a common printer profile and total color material amount restriction processing using a total color material amount restriction profile after the color management system processing, the method comprising:
    a step of acquiring a first total color material amount restriction profile that defines a correspondence relationship between color data prior to total color material amount restriction processing before the total color material amount restriction processing used in the color management system processing is implemented, and color data subjected to total color material amount restriction processing which is acquired by the total color material amount restriction processing, under a first configuration condition of the image formation apparatus;
    a step of acquiring a first color predictor that defines a correspondence relationship between the color data subjected to total color material amount restriction processing and an output color output from the image formation apparatus, under the first configuration condition of the image formation apparatus;
    a step of acquiring a second color predictor that defines a correspondence relationship between color data based on an image signal input to the image formation apparatus and an output color output from the image formation apparatus, under a second configuration condition of the image formation apparatus;
    a step of searching and acquiring, through the second color predictor, color data under the second configuration condition corresponding to an output color that matches or approximates an output color which is acquired through the first color predictor from the color data subjected to total color material amount restriction processing which is acquired by the total color material amount restriction processing using the first total color material amount restriction profile; and
    a step of associating the color data searched and acquired under the second configuration condition and the color data prior to total color material amount restriction processing and creating a second total color material amount restriction profile.

2. The total color material amount restriction profile creation method according to claim 1, wherein
    the color data includes data of multiple colors including a black color; and
    in the step of searching and acquiring the color data under the second configuration condition, the color data subjected to total color material restriction processing which is acquired by the total color material amount restriction processing using the first total color material amount restriction profile is used as an initial value, and by changing color data of other colors than the black color from the initial value without changing color data of the black color from the initial value, the color data under the second configuration condition is searched and acquired.

3. The total color material amount restriction profile creation method according to claim 1, wherein, in the step of searching and acquiring the color data under the second configuration condition, the color data subjected to total color material restriction processing acquired by the total color material amount restriction processing using the first total color material amount restriction profile is used as an initial value, and a data value is not changed from 0 with respect to color data of a color with a data value of 0 in the color data subjected to total color material amount restriction processing used as the initial value, and the color data under the second configuration condition is searched and acquired.

4. The total color material amount restriction profile creation method according to claim 1, wherein, in the step of searching and acquiring the color data under the second configuration condition, a non-linear optimization method with restriction is used.

5. A total color material restriction profile creation apparatus used in image signal processing which creates an image signal supplied to an image formation apparatus and which includes color management system processing using a common printer profile and total color material amount restriction processing using a total color material amount restriction profile after the color management system processing, the apparatus comprising:
   a search and acquisition device which searches and acquires, through a second color predictor, color data under a second configuration condition corresponding to an output color that matches or approximates an output color which is acquired through a first color predictor from color data subjected to total color material amount restriction processing which is acquired by the total color material amount restriction processing using a first total color material amount restriction profile, based on the first total color material amount restriction profile, the first color predictor and the second color predictor, where: the first total color material amount restriction profile defines a correspondence relationship between color data prior to total color material amount restriction processing before the total color material amount restriction processing used in the color management system processing is implemented and the color data subjected to total color material amount restriction processing acquired by the total color material amount restriction processing, under a first configuration condition of the image formation apparatus; the first color predictor defines a correspondence relationship between the color data subjected to total color material amount restriction processing and an output color output from the image formation apparatus, under the first configuration condition of the image formation apparatus; and the second color predictor defines a correspondence relationship between color data based on an image signal input to the image formation apparatus and an output color output from the image formation apparatus, under the second configuration condition of the image formation apparatus; and
   a profile creation device which associates the color data searched and acquired under the second configuration condition and the color data prior to total color material amount restriction processing and creates a second total color material amount restriction profile.

6. A non-transitory recording medium in which computer-readable code of a program is stored,
   wherein the program is a program that causes a computer to execute a procedure of creating a total color material amount restriction profile used in image signal processing which creates an image signal supplied to an image formation apparatus and which includes color management system processing using a common printer profile and total color material amount restriction processing using a total color material amount restriction profile after the color management system processing, and
   wherein the procedure comprises:
   a step of acquiring a first total color material amount restriction profile that defines a correspondence relationship between color data prior to total color material amount restriction processing before the total color material amount restriction processing used in the color management system processing is implemented, and color data subjected to total color material amount restriction processing acquired by the total color material amount restriction processing, under a first configuration condition of the image formation apparatus;
   a step of acquiring a first color predictor that defines a correspondence relationship between the color data subjected to total color material amount restriction processing and an output color output from the image formation apparatus, under the first configuration condition of the image formation apparatus;
   a step of acquiring a second color predictor that defines a correspondence relationship between color data based on an image signal input in the image formation apparatus and an output color output from the image formation apparatus, under a second configuration condition of the image formation apparatus;
   a step of searching and acquiring, through the second color predictor, color data under the second configuration condition corresponding to an output color that matches or approximates an output color which is acquired through the first color predictor from the color data subjected to total color material amount restriction processing which is acquired by the total color material amount restriction processing using the first total color material amount restriction profile; and
   a step of associating the color data searched and acquired under the second configuration condition and the color data prior to total color material amount restriction processing and creating a second total color material amount restriction profile.

7. An image signal processing apparatus which creates an image signal supplied to an image formation apparatus, comprising a total color material amount restriction profile creation apparatus according to claim 5.

8. An image signal processing system which creates an input signal from an image signal supplied to an image formation apparatus, the system comprising:
   a color management system processing unit which acquires color data subjected to color management system processing by applying color management system processing using a common printer profile to the input signal; and
   a total color material amount restriction processing unit which acquires color data subjected to total color material amount restriction processing by applying total color material amount restriction processing using a total color material amount restriction profile to the color data subjected to color management system processing, wherein
   the total color material amount restriction processing unit performs the total color material amount restriction processing using a first total color material amount restriction profile that defines a correspondence relationship between the color data subjected to color management system processing and the color data subjected to total color material amount restriction processing, under a first configuration condition of the image formation apparatus, as the image formation apparatus performs image formation under the first configuration; and
   the total color material amount restriction processing unit performs the total color material amount restriction processing using a second total color material amount restriction profile created by a total color material amount restriction profile creation method according to claim 1, as the image formation apparatus performs image formation under a second configuration.

9. The image signal processing system according to claim 8, further comprising a multivalued processing unit which applies multivalued processing to the color data subjected to total color material amount restriction processing.

10. The image signal processing system according to claim 8, further comprising a configuration determination unit which determines whether the image signal supplied to the image formation apparatus is based on the first configuration condition or the image signal is based on the second configuration condition,
    wherein the total color material amount restriction processing unit performs the total color material amount restriction processing using a total color material amount restriction profile based on a determination result in the configuration determination unit.

11. The image signal processing system according to claim 10, further comprising a multivalued processing unit which applies multivalued processing to the color data subjected to total color material amount restriction processing,
    wherein the multivalued processing unit applies multivalued processing based on a determination result by the configuration determination unit to the color data subjected to total color material amount restriction processing.

* * * * *